United States Patent
Nasu et al.

(10) Patent No.: US 10,696,325 B2
(45) Date of Patent: Jun. 30, 2020

(54) DRIVE FORCE CONTROL SYSTEM

(71) Applicant: TOYOTA JIDOSHA KABUSHIKI KAISHA, Toyota-shi, Aichi (JP)

(72) Inventors: Takanobu Nasu, Sagamihara (JP); Hiroshi Isono, Susono (JP); Hidekazu Sasaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 15/902,348

(22) Filed: Feb. 22, 2018

(65) Prior Publication Data

US 2018/0237064 A1   Aug. 23, 2018

(30) Foreign Application Priority Data

Feb. 22, 2017   (JP) ................... 2017-030916

(51) Int. Cl.
| | |
|---|---|
| B62D 9/00 | (2006.01) |
| B62D 6/10 | (2006.01) |
| B62D 6/00 | (2006.01) |
| B62D 5/04 | (2006.01) |
| B60W 30/00 | (2006.01) |

(52) U.S. Cl.
CPC ............ *B62D 9/002* (2013.01); *B60W 30/00* (2013.01); *B62D 5/0463* (2013.01); *B62D 6/003* (2013.01); *B62D 6/10* (2013.01); *B62D 5/0412* (2013.01)

(58) Field of Classification Search
CPC .... B62D 5/0463; B62D 5/0412; B62D 6/003; B62D 6/10; B62D 9/002; B60W 30/00; B60W 2710/083; B60W 2710/12; B60W 2510/083; B60W 2510/12; B60W 10/08; B60W 10/16; B60W 30/18172; B60W 30/188; B60L 2240/12; B60L 2240/22; B60L 2240/423; B60L 11/14; B60L 15/20; B60L 15/2009
USPC .......................................................... 701/41
See application file for complete search history.

(56) References Cited

U.S. PATENT DOCUMENTS

| | | | | |
|---|---|---|---|---|
| 4,565,997 A * | 1/1986 | Seko | ................. | B60K 28/066 180/272 |
| 6,640,923 B1 * | 11/2003 | Dominke | ............... | B62D 5/008 180/443 |
| 2005/0279562 A1 * | 12/2005 | Hara | ..................... | B62D 1/163 180/402 |
| 2017/0183008 A1 * | 6/2017 | Isono | .................. | B60W 30/188 |

FOREIGN PATENT DOCUMENTS

| | | |
|---|---|---|
| JP | 2005-151623 A | 6/2005 |
| JP | 2017-118735 A | 6/2017 |

* cited by examiner

*Primary Examiner* — Anthony R Jimenez
(74) *Attorney, Agent, or Firm* — Oliff PLC

(57) ABSTRACT

A drive force control system to increase a yaw rate greater than the yaw rate achieved by rotating a steering wheel to a maximum angle. A target yaw rate is calculated based on a steering angle of the steering wheel. A first predetermined torque and a second predetermined torque are calculated based on a difference between the target yaw rate and an actual yaw rate. When the steering angle of the steering wheel exceeds a first predetermined angle, a first correction torque to correct the first predetermined torque and a second correction torque to correct the second predetermined torque are calculated in accordance with the steering torque.

7 Claims, 9 Drawing Sheets

DRIVE FORCE CONTROL SYSTEM

CROSS REFERENCE TO RELATED APPLICATION

The present invention claims the benefit of Japanese Patent Application No. 2017-030916 filed on Feb. 22, 2017 with the Japanese Patent Office, the disclosures of which are incorporated herein by reference in its entirety.

BACKGROUND

Field of the Invention

Embodiments of the present disclosure relate to the art of a drive force control system for vehicles configured to generate a yaw moment in accordance with an operation of a steering wheel.

Discussion of the Related Art

JP-A-2005-151623 discloses a behavior control device for electric vehicles that controls torques applied to each drive wheel. According to the teachings of JP-A-2005-151623, a target turning amount such as a yaw rate, and a basic value of target slip angle between a travelling direction of the vehicle and an orientation of the vehicle are calculated based on a turning angle of a steering wheel. Then, a difference between drive forces of the right and left drive wheels is calculated based on the calculated target turning amount and the basic value of target slip angle.

Specifically, the control device described in JP-A-2005-151623 is configured to calculate the target yaw rate based on the turning angle of the steering wheel, and to control the driving force of the right and left wheels based on the target yaw rate. According to the teachings of JP-A-2005-1.51623, therefore, a yaw moment can be generated in accordance with a difference of the drive forces between the right and left wheels, in addition to a yaw moment generated in accordance with turning angle of the wheels. For this reason, the turning performance can be improved. However, in the conventional vehicles, a turning angle of the steering wheel is mechanically limited. That is, if the target yaw rate is calculated based on a turning angle of the steering wheel, a yaw rate greater than an upper limit angle of the steering wheel cannot be achieved.

SUMMARY

Aspects of embodiments of the present application have been conceived noting the foregoing technical problems, and it is therefore an object of embodiments of the present disclosure is to provide a drive force control system configured to achieve a yaw rate greater than a yaw rate possible to be achieved by turning a steering wheel to a maximum angle.

The drive force control system according to the embodiment of the present application comprises: a drive unit that applies torques to a right wheel and a left wheel; a steering device that turns a pair of steered wheels in accordance with an operating amount of a steering wheel; and a controller that controls the torques applied to the right wheel and the left wheel. In order to achieve the above-explained objective, the controller is configured to: calculate a target yaw rate based on a steering angle of the steering wheel; calculate a first predetermined torque to adjust a required torque of the right wheel and a second predetermined torque to adjust a required torque of the left wheel, based on a difference between the target yaw rate and an actual yaw rate; obtain a steering torque of the steering wheel; calculate a first correction torque to correct the first predetermined torque in accordance with the steering torque and a second correction torque to correct the second predetermined torque in accordance with the steering torque, when the steering angle of the steering wheel exceeds a first predetermined angle; and transmit a signal to the drive unit to achieve a first target torque of the right wheel calculated based on the first predetermined torque and the first correction torque, and to achieve a second target torque of the left wheel calculated based on the second predetermined torque and the second correction torque.

In a non-limiting embodiment, the controller may be further configured to calculate the first correction torque and the second correction torque based on an increase in the steering torque from a point at which the steering angle exceeds the first predetermined angle, when the steering torque is increased to rotate the steering wheel more than the first predetermined angle.

In a non-limiting embodiment, the controller may be further configured to reduce the first correction torque and the second correction torque in accordance with a length of time to rotate the steering wheel more than the first predetermined angle.

In a non-limiting embodiment, the controller may be further configured to offer a warning to a driver when the length of time to rotate the steering wheel more than the first predetermined angle exceed a predetermined period of time.

In a non-limiting embodiment, the steering device may include, a motor that applies a torque to a transmission mechanism between the steering wheel and the steered wheels. In addition, the controller may be further configured to control an output torque of the motor in accordance with the steering torque of the steering wheel, and to maintain the output torque of the motor to the steering torque at a point when the steering wheel is rotated to the predetermined angle, until the steering angle of the steering wheel is reduced to a second predetermined angle that is smaller than the first predetermined angle.

In a non-limiting embodiment, the controller may be further configured to set an upper limit value of the first correction torque and the second correction torque.

Thus, according to the embodiment of the present disclosure, a first predetermined torque to adjust the required torque of the right pair of wheels and the second predetermined torque to adjust the required torque of the left pair of wheels, are calculated based on the difference between the target yaw rate and an actual yaw rate. When the steering angle of the steering wheel exceeds the first predetermined angle, a first correction torque to correct the first predetermined torque and a second correction torque to correct the second predetermined torque are calculated. The controller transmits a signal to the drive unit to achieve the first target torque of the right pair of wheels calculated based on the first predetermined torque and the first correction torque, and to achieve the second target torque of the left pair of wheels calculated based on the second predetermined torque and the second correction torque. According to the embodiment of the present disclosure, therefore, a yaw rate greater than the target yaw rate achieved in accordance with the steering angle of the steering wheel can be achieved when the steering wheel is turned to the maximum rotational angle. For this reason, a turning performance of the vehicle can be improved.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Figure 1:
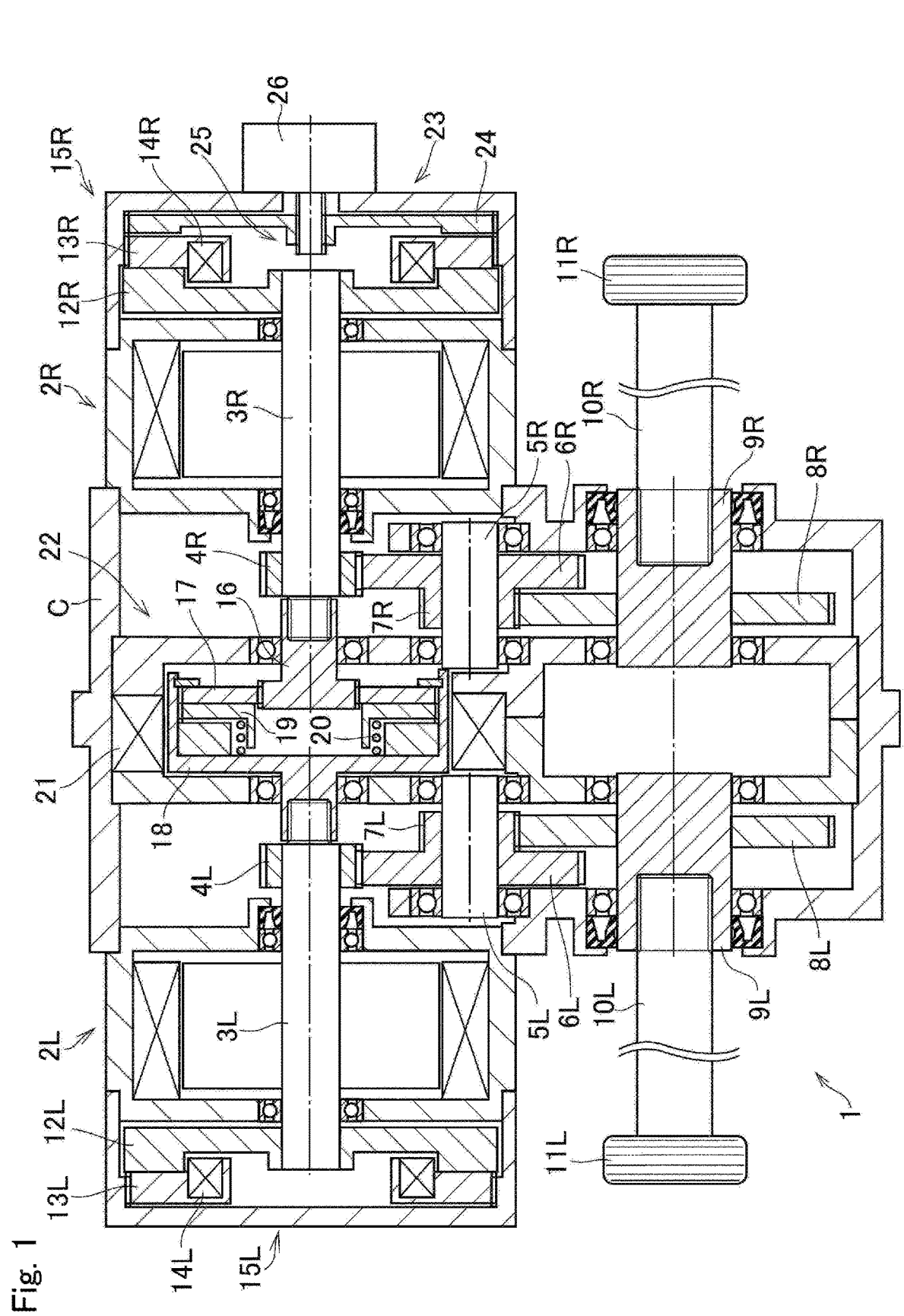
FIG. 1 is a cross-sectional view showing one example of a structure of the drive unit according to the embodiment of the present disclosure.

Embodiment of the present disclosure will now be explained with reference to the accompanying drawings. Turning now to FIG. 1, there is shown one example of a structure of a drive unit to which the drive force control system according to the present disclosure is applied. As can be seen from FIG. 1, a structure of the drive unit 1 is substantially symmetrical across a width center of the vehicle. In the following explanation, only a configuration on the right half in the figure will be explained, and an explanation for the left half will be omitted except for a configuration different from that of the right half. In FIG. 1, accordingly, the reference letter "R" designates members arranged in the right half of the drive unit 1, and the reference letters "L" designates members arranged in the left half of the drive unit 1. In the flowing explanation, the members in the right half of the drive unit 1 will be called the "first member", and the members in the left half of the drive unit 1 will be called the "second member" as necessary.

The drive unit 1 includes a motor 2 serving as a prime mover of a vehicle. For example, a motor-generator such as a permanent magnet, synchronous motor may be used as the drive motor, as in the case of conventionally known motors serving as prime movers of hybrid vehicles and electric vehicles.

An output gear 4 is fitted onto a laterally inner end of an output shaft 3 of the motor 2 extending widthwise, and a countershaft 5 extends parallel to the output shaft 3. A counter driven gear 6 that is diametrically larger than the output gear 4 is fitted onto a laterally outer portion of the countershaft 5, and a pinion gear 7 that is diametrically smaller than the counter driven gear 6 is also fitted onto a laterally inner portion of the countershaft 5 to be meshed with a final reduction gear 8 that is diametrically larger than the pinion gear 7.

A cylindrical shaft 9 is inserted into the final reduction gear 8 about the rotational center thereof in such a manner as to protrude laterally outwardly while opening to laterally outside. A laterally inner end of a driveshaft 10 is splined into the opening of the cylindrical shaft 9, and a drive wheel 11 is attached to a laterally outer end of the driveshaft 10.

A disc-shaped brake rotor 12 made of magnetic material is fitted onto a laterally outer end of the output shaft 3. An annular brake stator 13 faces the brake rotor 12. The brake stator 13 is splined into a casing C so that the brake stator 13 is allowed to move toward the brake rotor 12 but not allowed to rotate. The brake stator 13 is provided with a coil 14 so that the brake stator 13 is brought into contact to the brake rotor 12 by an electromagnetic force established by energizing the coil 14.

A brake torque is applied to the brake rotor 12 by frictionally contacting the brake stator 13 to the brake rotor 12. Thus, the brake stator 13, the brake rotor 12, and the coil 14 form a friction brake 15.

An extension shaft 16 is attached to the leading end of the first output shaft 3R closer to the width center of the vehicle than the first output gear 4R. An annular clutch disc 17 is fitted onto the extension shaft 16 to be rotated integrally therewith.

A bottomed-cylindrical cover shaft 18 holding the clutch disc 17 in a hollow space is attached to the leading end of the second output shaft 3L closer to the width center of the vehicle than the second output gear 4L.

An annular pressure plate 19 is interposed between a bottom face of the cover shaft 18 and the clutch disc 17. The pressure plate 19 is made of magnetic material, and is splined into the cover shaft 18 to be rotated integrally with the cover shaft 18 while being allowed to move in the axial direction of the cover shaft 18.

A spring 20 is interposed between the bottom face of the cover shaft 18 and the pressure plate 19 to push the pressure plate 19 toward the clutch disc 17.

A coil 21 is provided on the outer side of the cover shaft 18. The coil 21 generates an electromagnetic force upon being energized, so that the pressure plate 19 is isolated away from the clutch disc 17 against a spring force of the spring 20.

The clutch disc 17, the pressure plate 19, the spring 20, and the coil 21 form an electromagnetic clutch (to be simply referred to as a clutch hereinafter) 22. When the coil 21 is not energized, the clutch disc 17 and the pressure plate 19 are contacted to each other by the spring force of the spring 20 to be rotated integrally. When the coil 21 is energized, a torque transmitting capacity between the clutch disc 17 and the pressure plate 19 is changed in accordance with the electric power applied to the coil 21.

Thus, the first motor 2R and the second motor 2L can be rotated integrally while transmitting a torque therebetween by frictionally engaging the pressure plate 19 and the clutch disc 17 without energizing the coil 21. A torque transmitting capacity between the pressure plate 19 and the clutch disc 17 can be reduced by energizing the coil 21. As a result, the first motor 2R and the second motor 2L rotate relatively to each other, whereby a torque transmitted between the first motor 2R and the second motor 2L can be reduced.

The brake torque applied to the drive wheels 11R and 11L cannot be maintained when the power is off to park the vehicle. In order to maintain a frictional contact between the first brake rotor 12R and the first brake stator 13R thereby halting the drive wheels 11R and 11L even when the power is off, the drive unit 1 is provided with a parking lock device 23. Specifically, the parking lock device 23 comprises an annular movable plate 24 opposed to the first brake rotor 12R across the first brake stator 13R, a feed screw mechanism 25, and a brake motor 26 that actuates the feed screw mechanism 25.

The feed screw mechanism 25 is adapted to translate a rotary motion of the brake motor 26 into a linear motion thereby pushing the movable plate 24 toward the first brake stator 13R so as to bring the first brake stator 13R into frictional contact to the first brake rotor 12R. That is, the feed screw mechanism 25 keeps the first output shaft 3R stopping even if current supply to the brake motor 26 is interrupted. Thus, the feed screw mechanism 25 generates forward thrust force by generating forward torque by the brake motor 26, and the forward thrust force is applied to the first brake stator 13R. Consequently, the first brake stator 13R is frictionally engaged with the first brake rotor 12R to halt the first output shaft 3R. By contrast, the first output shaft 3R is allowed to rotate by generating a reverse torque by the brake motor 26 to withdraw the first brake stator 13R from the first brake rotor 12R. That is, the brake force for stopping the rotation of the first output shaft 3R is cancelled.

Specifically, reversed efficiency of the feed screw mechanism 25 to translate the linear motion into the rotational motion is adjusted to be lower than forward efficiency to translate the rotational motion into the linear motion. According to an embodiment, therefore, the first output shaft 3R may be halted by pushing the movable plate 24 and the first brake stator 13R toward the first brake rotor 12R by the feed screw mechanism 25. Therefore, the first output shaft 3R may be halted by the parking lock device 23 even if the current supply to the first coil 14R and the brake motor 26 is stopped while the feed screw mechanism 25 is operated by the brake motor 26 to halt the first output shaft 3R.

Thus, when the vehicle is parked, the current supply to the coil 21 is stopped and hence the clutch 22 is brought into engagement. In this situation, therefore, rotation of the second output shaft 3L is also stopped by stopping the rotation of the first output shaft 3R by the parking lock device 23. In other words, the brake torques applied to the drive wheels 11R and 11L can be maintained. The parking lock device 23 may be arranged in such a manner as to stop the rotation of the second output shaft 3L, or may be arranged in such a manner as to stop the rotation of the first countershaft 5R instead of the first output shaft 3R, for example.

As described, in the drive unit 1, the right and the left drive wheels 11R and 11L may be rotated integrally to propel the vehicle by engaging the clutch 22 completely to apply the same torques to the right and the left drive wheels 11R and 11L. For example, the vehicle can be propelled by a torque generated by at least one of the first motor 2R and the second motor 2L. In this case, the torque generated by one of the first motor 2R and the second motor 2L may be regenerated partially by the other one of the motors. Further, one of the first motor 2R and the second motor 2L can generate a large torque, and the other one of the motors can generate a torque in an amount corresponding to the shortage. Thus, output torques of the motors 2R and 2L can be adjusted as appropriate.

When the right and the left drive wheels 11R and 11L are rotated relative to each other during turning or the other like occasions, or when differentiating torques transmitted to the right and the left drive wheels 11R and 11L5, the vehicle can be propelled by generating a torque by at least one of the motors 2R and 2L while causing a slip in the clutch 22. Further, the vehicle can be propelled by generating the drive torque by one of the motors 2R and 2L while regenerating part of the drive torque by the other one of the motors 2R and 2L. For this purpose, the output torques of the motors 2R and 2L can be adjusted as appropriate.

When a speed difference or a torque difference between the right and the left drive wheels 11R and 11L is equal to or greater than a predetermined value, the outputs of the right and the left drive wheels 11R and 11L may be appropriately adjusted by completely disengaging the clutch 22. In this situation, for example, the motor 2R (2L) connected to the outer wheel may be operated as a motor and the motor 2R (2L) connected to the inner wheel may be operated as a generator. Instead, only the motor 2R (2L) connected to the outer wheel may be operated to generate a torque.

Figure 2:
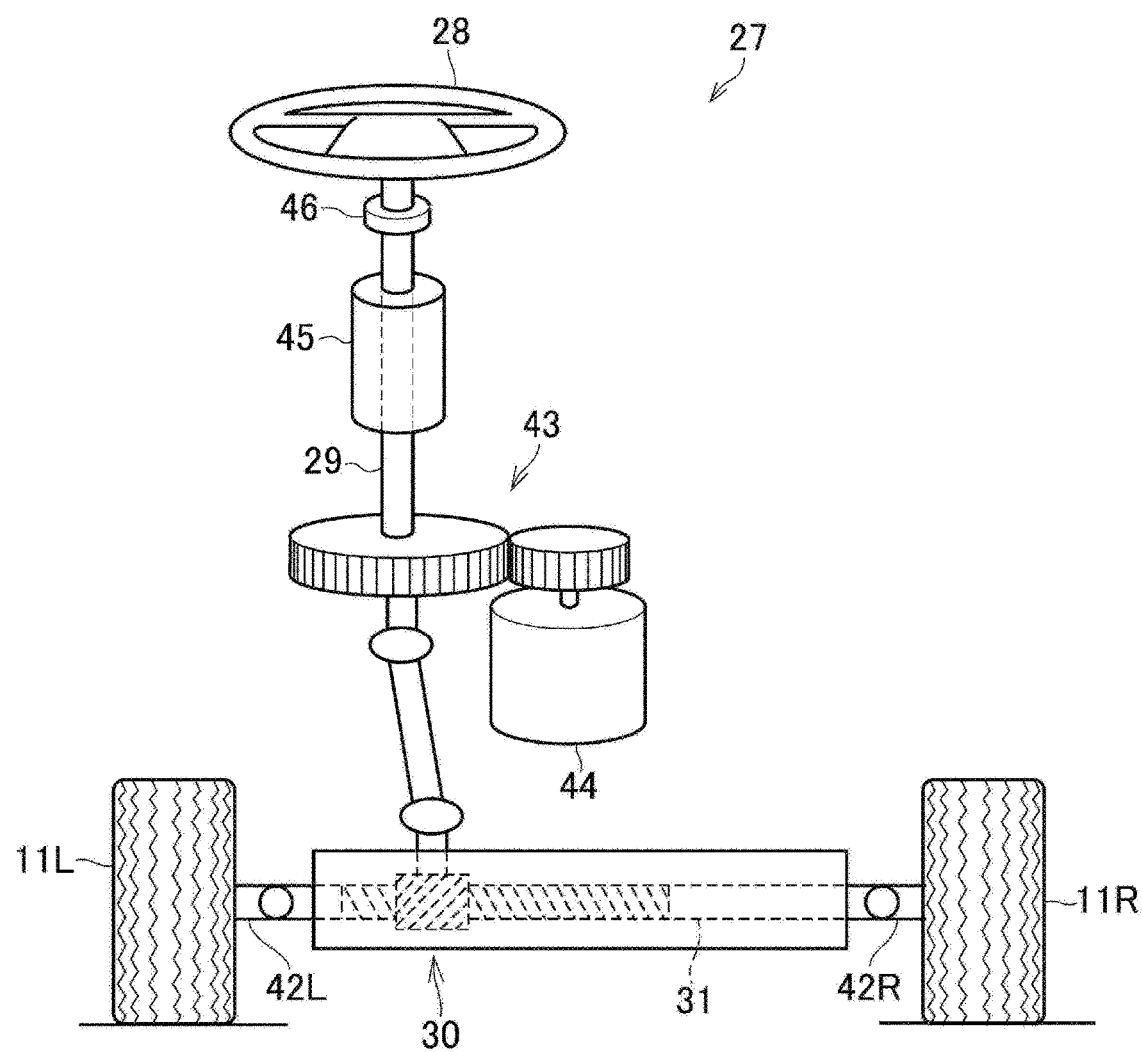
FIG. 2 is a schematic illustration showing a structure of a steering device of the vehicle to which the control system according to the embodiment is applied.

The front wheels 11R and 11L are turned by a steering device 27 shown in FIG. 2 in accordance with the operation amount (turning angle) of the steering wheel 28.

In the steering device 27, a rotation of the steering shaft 29 connected to the steering wheel 28 is transmitted the to a rack bar 31 of a transmission mechanism such as a rack and pinion mechanism 30. A right drive wheel 11R is connected to a right end of the rack bar 31 through a right tie rod 42R and a knuckle (not shown), and a left drive wheel 11L is connected to a left end of the rack bar 31 through a left tie rod 42L and a knuckle (not shown).

An electric power steering motor (to be abbreviated as the "EPS motor" hereinafter) 44 is connected to the steering shaft 29 via a speed reducer 43, and torque of the steering shaft 29 is increased by an output torque of the EPS motor 44.

A steering torque sensor 45 that detects a torque of the steering shaft 29, and a steering angle sensor 46 that detects a turning angle of the steering shaft 29 are arranged on the steering shaft 29 between the steering wheel 28 and the speed reducer 43.

In the steering device 27, orientations of the right front wheel 11R and the left front wheel 11L are turned by rotational motion (i.e., torque) of the steering wheel 28 transmitted through the rack and pinion mechanism 30. In order to reduce an effort of the driver to turn the front wheels 11R and 11L by rotating the steering wheel 28, the EPS motor 44 generates an assist torque to rotate the steering wheel 28 in accordance with a torque detected by the steering torque sensor 45. In order to restrict a turning angle of the steering wheel 28 within a predetermined range, a movable range of the rack bar 31 is restricted by a restricting mechanism (not shown).

Figure 3:
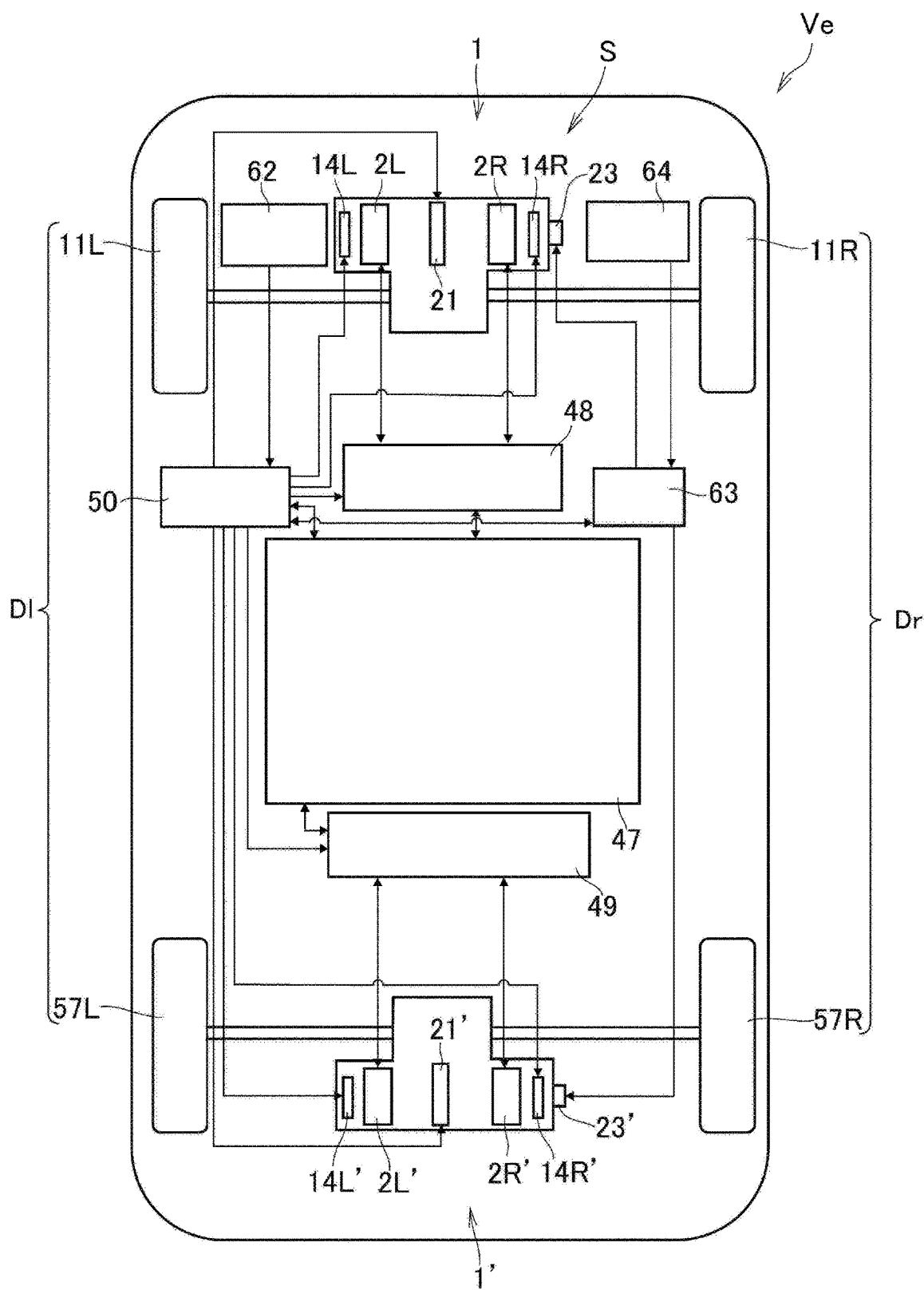
FIG. 3 is a schematic illustration showing one example of a structure of the vehicle to which the control system according to the embodiment is applied.

Next, an example of a configuration of a control system S for a vehicle Ve including the drive unit 1 described above will be described. FIG. 3 is a diagram schematically showing an example of the configuration of the system. As illustrated in FIG. 3, the vehicle Ve is a four wheel drive (4WD) layout vehicle in which a first drive unit 1 is arranged in the front side of the vehicle Ve and a second drive unit 1' is arranged in the rear side of the vehicle Ve substantially symmetrical across the longitudinal center of the vehicle Ve. In the following explanation, the members of the second drive unit 1' with the same configuration as the members (including the first motor 2R) provided in a torque transmission path between the first motor 2R and the right drive wheel 11R in the first drive unit 1 will be called the "third member". The members of the first drive unit 1 with the same configuration as the members (including the second motor 2L) provided in a torque transmission path between the second motor 2L and the left drive wheel 11L in the first drive unit 1 will be called the "fourth member". The clutch and the parking lock device in the second drive unit 1', as well as the members of these, will be called a "second clutch", a "second parking lock device", and the "second member". The apostrophe on the reference numeral designates members of the second drive unit 1', for the distinction from the members of the first drive unit 1.

In the first drive unit 1, the first motor 2R, the second motor 2L, and the coils 14R, 14L, and 21 receive electric power from a high-voltage power storage device 47 including a battery and a capacitor, as a conventional power storage device used in hybrid vehicles and electric vehicles. Likewise, in the second drive unit 1', the first motor 2R', the second motor 2L', and the coils 14R', 14L', and 21' also receive the electric power from the power storage device 47. The power storage device 47 is charged with the power generated by the motors 2R, 2L, 2R', and 2L'. In the following explanation, the motor 2R' of the second drive unit 2' will be called the "the third motor" 2R', and the motor 2L of the second drive unit 2' will be called the "the fourth motor" 2L.

A first inverter 48 is interposed between the power storage device 47 and the motors 2R and 2L, and the first inverter 48 is adapted to switch between direct current and alternate current, and to control values and frequencies of current supplied to the motors 2R and M. The second drive unit 1' is also provided with a second inverter 49 that can control a value and a frequency of the current supplied to the motors 2R' and 2L'.

Figure 4:
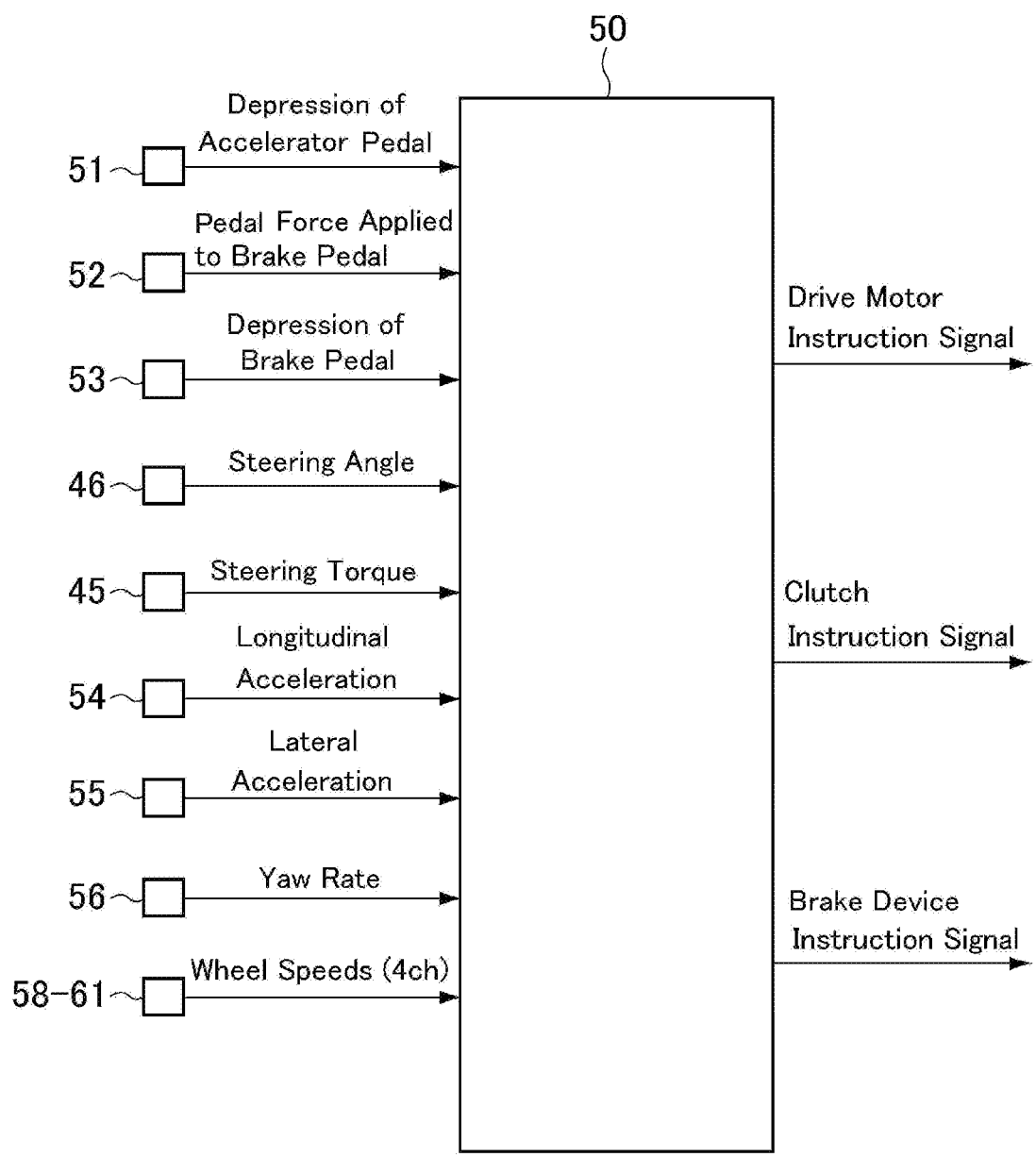
FIG. 4 is a block diagram showing functions of a first ECU.

A first electronic control unit 50 (to be abbreviated as the "first ECU" hereinafter) is provided to control the motors 2R and 2L and the coils 14R, 14L, and 21 of the first drive unit 1, as well as the motors 2R and 2L' and the coils 14R, 14L', and 21' of the second drive unit 1'. The first ECU 50 as a "controller" of the embodiment mainly includes a microcomputer as in any known ECUs installed in vehicles. FIG. 4 is a block diagram illustrating functions of the first ECU 50.

Signals representing posture of the vehicle Ve and operating conditions are sent to the first ECU 50, and the first ECU 50 transmits control signal to the first inverter 48 and the second inverter 49 based on the incident signals, preinstalled formulas and maps, and the like. Specifically, the first ECU 50 transmits control signals for controlling output torques of the motors 2R, 2L, 2R' and 2L', control signals for controlling torque transmitting capacities of the clutches 22 and 22', control signals for controlling the friction brakes 15 and 15' and so on. The control signals sent from the first ECU 50 to the first inverter 48 and the second inverter 99 are obtained while taking account of conventionally known Antilock Brake system (ABS), Traction Control (TRC), Electronic Stability Control (ESC), Dynamic Yaw rate Control (DYC), and the like.

For example, the first ECU 50 receives signals an accelerator sensor 51 that detects a depression of an accelerator pedal, a first brake pedal sensor 52 that detects a pedal force applied to the brake pedal, a second brake pedal sensor 53 that detects a depression of the brake pedal, a steering angle sensor 46 that detects a steering angle of the steering wheel 28, and the steering torque sensor 45 that detects a steering torque of the steering wheel 28. The first ECU 50 also receives signals representing data about the posture of the vehicle Ve, from a first G sensor 54 that detects longitudinal acceleration of the vehicle Ve, a second G sensor 55 that detects lateral acceleration of the vehicle Ve, a yaw rate sensor 56 that detects a yaw rate of the vehicle Ve, and wheel speed sensors 58, 59, 60, and 61 that respectively detect rim speeds of the right front wheel 11R, the left front wheel 11L, the right rear wheel 57R, and the left rear wheel 57L.

A first auxiliary battery 62 is provided to supply power for operating the first ECU 50 and for controlling a transistor (not illustrated) installed in the first inverter 48. The first auxiliary battery 62 is set to be at a lower voltage than the power storage device 27.

To this end, in the example illustrated in FIG. 3, a second ECU 63 is provided independently from the first ECU 50. In order to control a brake force in the event of failure of the first ECU 50, the second ECU 63 is electrically connected to the parking lock devices 23 and 23' (specifically, the brake motors 26 and 26'), and a second auxiliary battery 64 is connected to the second ECU 45.

Figure 5:
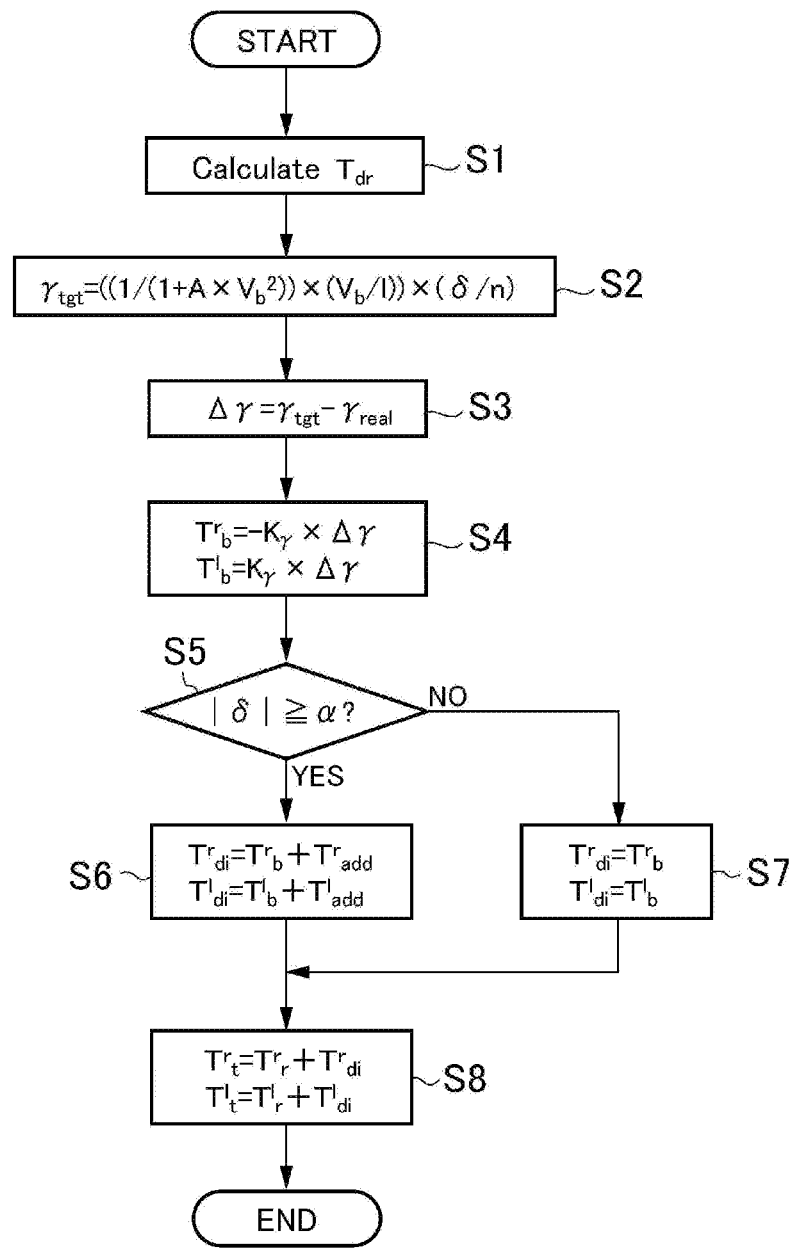
FIG. 5 is a flowchart showing a routine according to the first control example.

Next, a control example for determining the output of each of the motors 2R, 2L, 2R', and 2L' will be described with reference to FIG. 5. The routine illustrated in FIG. 5 is executed by the first ECU 50. At step S1, a required torque $T_{dr}$ of the vehicle Ve is calculated based on a position of the accelerator pedal, a depression of the brake pedal or a pedal force applied to the brake pedal, wheel speeds, a longitudinal acceleration, and so on. Details of calculation at step S1 is described in Japanese Patent Application No. 2015-253254.

Then, in order to improve a turning stability by executing the Electronic Stability Control (ESC) and Dynamic Yaw rate Control (DYC), a first target torque $T^r_t$ of the right pair drive of wheels Dr as a total value of a torque of the right front wheel 11R and a torque of the right rear wheel 57R is calculated, and a second target torque $T^l_r$ of the left pair of wheels Dl as a total value of a torque of the left front wheel 11L and a torque of the left rear wheel 57L is calculated.

To this end, a first required torque $T^r_r$ of the right pair of wheels Dr, a second required torque $T^l_r$ of the left pair of wheels Dl, and a first distribution torque $T^r_{di}$ to the right pair of wheels Dr and a second distribution torque $T^l_{di}$ to the left pair of wheels Dl to achieve a required yaw rate, so as to output torques equally from the first pair of wheels Dr and from the second pair of wheels Dl to achieve a required drive force are calculated. Then, a first target torque $T^r_t$ of the outer pair of wheels (e.g., the right pair of wheels Dr) is calculated by adding the first distribution torque $T^r_{di}$ to the first required torque $T^r_r$ of the right pair of wheels Dr, and a second target torque $T^l_r$ of the inner pair of wheels (e.g., the left pair of wheels Dl) is calculated by subtracting the second distribution torque $T^l_{di}$ from the second required torque $T^l_r$ of the left pair of wheels Dl.

In order to obtain the distribution torques $T^r_{di}$ and $T^l_{di}$, at step S2, a target yaw rate $\gamma_{tgt}$ is calculated based on a steering angle δ of the steering wheel 28, using the following formula:

$$\gamma_{tgt}=((1/(1+A\cdot V_b^2))\cdot(V_b/l))\cdot(\delta/n),$$

where "A" is a target stability factor, "l" is a wheelbase, and "n" is a steering gear ratio calculated based on a ratio between the steering angle δ of the steering shaft 29 and a turning angle of the pair of front wheels 11R and 11L.

Then, at step S3, a difference Δγ between the target yaw rate $\gamma_{tgt}$ and an actual yaw rate $\gamma_{real}$ is calculated. Thereafter, at step S4, a first predetermined torque $T^r_b$ subtracted from the first required torque $T^r_r$ of the one of the right and left pairs of wheels (e.g., the right pair of wheels Dr), and a second predetermined torque $T^l_b$ added to the second required torque $T^l_r$ of the other pair of wheels (e.g., the left pair of wheels Dl), are calculated based on the difference Δγ. That is, torques of one of the right and left pairs of the wheels are increased and torques of the other pairs of the wheels are reduced in such a manner as to achieve the target yaw rate without changing the drive force to propel the vehicle Ve. Specifically, absolute values of the first predetermined torque $T^r_b$ and the second predetermined torque $T^l_b$ are equal to each other, and the first predetermined torque $T^r_b$ and the second predetermined torque $T^l_b$ are calculated using the following formulas:

$$T^r_b = K_\gamma \cdot \Delta\gamma; \text{ and}$$

$$T^l_b = K_\gamma \cdot \Delta\gamma,$$

where K is a coefficient to translate a yaw rate into a torque, and is stored in the first ECU 50.

Thereafter, it is determined at step S5 whether or not an absolute value of the steering angle δ of the steering wheel 28 is equal to or greater than a first predetermined angle α. Such determination at step S5 is executed to determine whether or not the steering wheel 28 is turned to the maximum angle. To this end, the first predetermined angle α is set to the maximum rotational angle of the steering wheel 28. Specifically, a right (i.e., clockwise) rotational angle of the steering wheel 28 is a positive value, and a left (i.e., counterclockwise) right rotational angle of the steering wheel 28 is a negative value. At step S5, therefore, an absolute value of the steering angle δ of the steering wheel 28 is compared to the first predetermined angle α.

When the driver requires a yaw rate greater than that achieved by turning the steering wheel 28 to the maximum rotational angle, the driver would attempt to further rotate the steering wheel 28 so that a steering torque $T_\delta$ of the steering wheel 28 is increased. In order to fulfill such requirement of the driver, if the steering angle δ of the steering wheel 28 is equal to or greater than the first predetermined angle α so that the answer of step S5 is YES, the routine progresses to step S6 to calculate the first distribution torque $T_{di}$ to the right pair of wheels Dr and the second distribution torque $T^l_{di}$ to the left pair of wheels Dl. Specifically the first distribution torque $T^r_{di}$ is calculated by correcting the first predetermined torque $T^r_b$ in accordance with the steering torque $T_\delta$, and the second distribution torque is calculated by correcting the second predetermined torque $T^l_b$ in accordance with the steering torque $T_\delta$. Thus, the predetermined torques $T^r_b$ and $T^l_b$ calculated based on the target yaw rate $\gamma_{tgt}$ are corrected in accordance with the steering torque $T_\delta$.

At step S6, more specifically, the first distribution torque $T^r_{di}$ is calculated by adding a first correction torque $T^r_{add}$ to the first predetermined torque $T^r_b$, and the second distribution torque $T^l_{di}$ is calculated by adding a second correction torque $T^l_{add}$ to the second predetermined torque $T^l_b$. Magnitudes of the correction torques $T^r_{add}$ and $T^l_{add}$ are identical to each other, but directions of the correction torques $T^r_{add}$ and $T^l_{add}$ are opposite to each other. That is, one of the predetermined torques $T^r_b$ and $T^l_b$ (e.g., the first predetermined torque $T^r_b$) calculated at step S4 is set to a negative value. At step S6, therefore, the second predetermined torque $T^l_b$ as a positive value is increased, and the first predetermined torque $T^r_b$ as a negative is reduced. For example, values of the correction torques $T^r_{add}$ and $T^l_{add}$ may be determined with reference to a map determining the correction torques $T^r_{add}$ and $T^l_{add}$ in such a manner that the correction torques $T^r_{add}$ and $T^l_{add}$ are increased with an increase in the steering torque $T_\delta$. Such map is prepared based on a result of an experiment or simulation and installed in the first ECU 50.

By contrast, if the steering angle δ of the steering wheel 28 is smaller than the first predetermined angle α so that the answer of step S5 is NO, the routine progresses to step S7 to employ the first predetermined torque $T^r_b$ calculated at step S4 as the first distribution torque $T^r_{di}$ without correcting, and to employ the second predetermined torque $T^l_b$ calculated at step S4 as the second distribution torque $T^l_{di}$ without correcting.

After thus setting the distribution torques $T^r_{di}$ and $T^l_{di}$ at step S6 or S7, the routine progresses to step S8 to calculate the first target torque $T^r_t$ by adding the first distribution torque $T^r_{di}$ to the first required torque $T^r_r$, and to calculate the second target torque $T^l_t$ by adding the second distribution torque $T^l_{di}$ to the second required torque $T^l_r$. Thereafter, the routine returns. Consequently, command signals for controlling output torques of the motors 2R, 2L, 2R', and 2L', and command signals for controlling torque transmitting capacities of the clutches 22 and 22' are set and transmitted in accordance with the first target torque $T^r_t$ and the second target torque $T^l_t$ calculated at step S8. Optionally, the first target torque $T^r_t$ and the second target torque $T^l_t$ may be further corrected taking account of a vertical force at each wheel, and a friction coefficient (or slip rate) between a road surface and each wheel.

By thus executing the routine shown in FIG. 5, a yaw rate greater than the target yaw rate $\gamma_{tgt}$ achieved in accordance with the steering angle δ of the steering wheel 28 can be achieved when the steering wheel 28 is turned to the maximum rotational angle. According to the embodiment, therefore, a turning performance of the vehicle can be improved.

As described, the EPS motor 44 is adapted to generate torque in accordance with the steering angle δ of the steering wheel 28. If the steering wheel 28 is turned to the maximum angle for a long period of time, a temperature of the EPS motor 44 may be raised and consequently the EPS motor 44 may be thermally damaged. As also described, the motors of the outer pairs of wheels increase the torques of the outer pairs of wheels during turning, and if output torques of those motors are increased for a long period of time, temperatures of those motors may also be increased.

Figure 6:
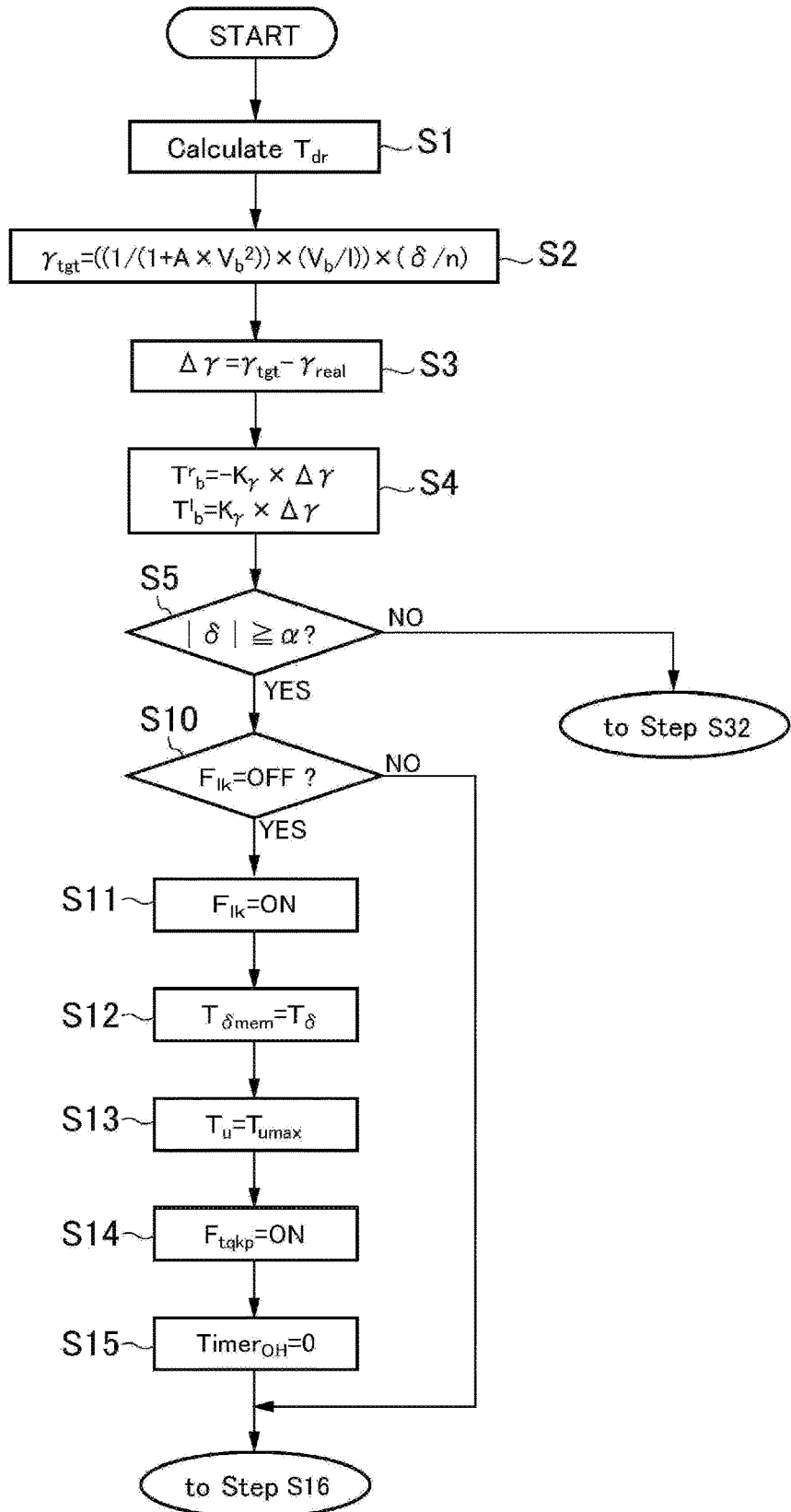
FIG. 6 is a flowchart showing steps S1 to S15 in a routine according to the second control example.
Figure 7:
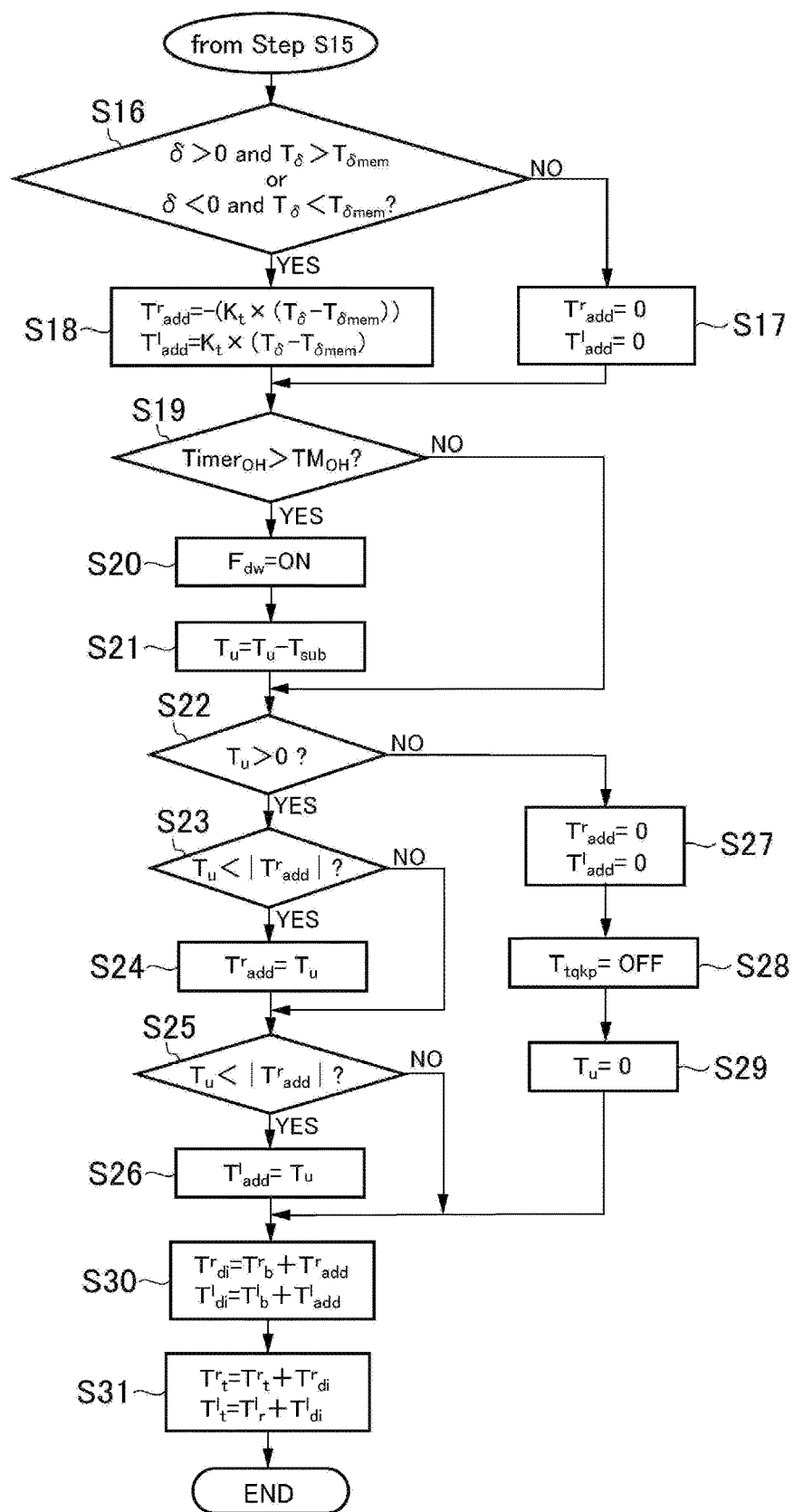
FIG. 7 is a flowchart showing steps S16 to S31 in the routine according to the second control example.
Figure 8:
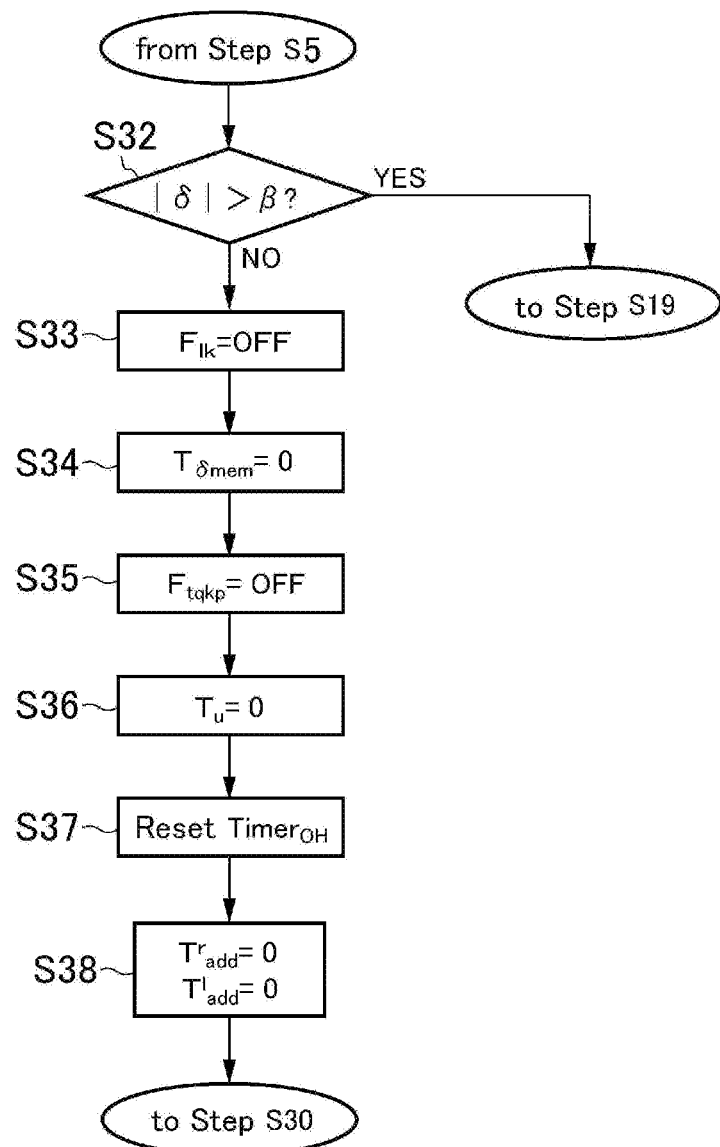
FIG. 8 is a flowchart showing steps S32 to S38 in the routine according to the second control example.

A routine executed to limit damages on the EPS motor 44 and the motors 2R, 2L, 2R', and 2L' is shown in FIGS. 6 to 8. The routines in flowcharts shown in FIGS. 6 to 8 may be implemented consecutively, but are separately shown in FIGS. 6 to 8 for the sake of explanation. In the routine shown in FIG. 6, the foregoing steps S1 to S5 are also executed.

In the routine shown in FIG. 6, if the steering angle δ of the steering wheel 28 is equal to or greater than the first predetermined angle α so that the answer of step S5 is YES, it is determined whether the steering angle δ exceeds the first predetermined angle α first time since the steering wheel 28 is started to be turned. In this case, the routine progresses to step S10 to determine whether or not a determination flag $F_{lk}$ is turned off. Specifically, the determination flag $F_{lk}$ is turned on when the steering angle δ exceeds the first predetermined angle α, and turned off when the steering angle δ falls below the after-mentioned second predetermined angle ß.

If the determination flag $F_{lk}$ is turned off so that the answer of step S10 is YES, the routine progresses to step S11 to turn on the determination flag $F_{lk}$. Then, at step S12, a steering torque $T_{\delta mem}$ of a steering torque $T_\delta$ at a point when the steering angle δ exceeds the first predetermined angle α is stored in the first ECU 50.

As described, according to the embodiment, the distribution torques $T^r_{di}$ and $T^l_{di}$ are increased greater than the torques calculated based on the target yaw rate $\gamma_{tgt}$. However, in order to limit the thermal damages on the motors 2R, 2L, 2R', and 2L', and to reduce uncomfortable feeling when reducing the distribution torques $T''_{di}$ and $T^l_{di}$ upon satisfaction of the after-mentioned condition, it is preferable to restrict torques to increase the distribution torques $T''_{di}$ and $T^l_{di}$. To this end, the routine progresses to step S13 to set an upper limit value $T_u$ of the first correction torque $T''_{add}$ added to the first predetermined torque $T''_b$, and the second correction torque $T^l_{add}$ added to the second predetermined torque $T^l_b$. The upper limit value $T_u$ is set taking account of the above-explained reasons, and stored in the first ECU 50.

As described, the EPS motor 44 generates a torque in accordance with the steering torque $T_\delta$. That is, if the torque is further applied to the steering wheel 28 after turning the steering wheel 28 to the maximum angle, the output torque of the EPS motor 44 may be further increased. In this situation, it is difficult to determine whether the steering torque $T_\delta$ detected by the torque sensor 45 is increased to increase the yaw rate in line with the driver's intension, or increased with an increase in the output torque of the EPS motor 44. In other words, it is difficult to properly determine an increase in the steering torque $T_\delta$ in line with the driver's intension. For this reason, the routine progresses to at step S14 to turn on a maintenance flag $F_{tqkp}$ to maintain the output torque of the EPS motor 44 to a constant torque.

Then, the routine progresses to step S15 to start a measurement of elapsed time from a point at which the output torque of the EPS motor 44 is maintained to the constant torque. In other words, an elapsed time is measured from a point at which the maintenance flag $F_{tqkp}$ is turned on. If the determination flag $F_{lk}$ is has already been turned on so that the answer of step S10 is NO, the routine skips steps S11 to S15.

After starting the measurement of elapsed time at step S15, or if the answer of step S10 is NO, the routine progresses to step S16 to determine whether it is necessary to increase a difference between torques of the right pair of wheels Dr and the left pair of wheels Dl to achieve the required yaw rate. At step S16, specifically, it is determined whether or not the following condition is satisfied:

$\delta > 0$ and $T_\delta > T_{\delta mem}$; or $\delta < 0$ and $T_\delta < T_{\delta mem}$.

Specifically, the steering angle $\delta$ is increased positively by applying the positive steering torque $T_\delta$ to the steering wheel 28, the steering angle $\delta$ is increased negatively by applying the negative steering torque $T_\delta$ to the steering wheel 28. As described, the steering torque $T_{\delta mem}$ has been stored in the first ECU 50 at step S12. That is, at step S16, it is determined whether or not the torque is applied to the steering wheel 28 to rotate the steering wheel 28 further than the maximum angle.

If it is not necessary to increase the difference between the torques of the right pair of wheels Dr and the left pair of wheels Dl so that the answer of step S16 is NO, the routine progresses to step S17 to set each of the first correction torque $T''_{add}$ and the second correction torque $T^l_{add}$ individually to zero. By contrast, if it is necessary to increase the difference between the torques of the right pair of wheels Dr and the left pair of wheels Dl so that the answer of step S16 is YES, the routine progresses to step S18 to calculate each of the first correction torque $T''_{add}$ and the second correction torque $T^l_{add}$ individually based on the steering torque $T_\delta$, as expressed by the following expressions:

$T''_{add} = -(K_t \cdot (T_\delta - T_{\delta mem}))$; and $T^l_{add} = -K_t \cdot (T_\delta - T_{\delta mem})$.

At step S18, specifically, the first correction torque $T''_{add}$ and second correction torque $T^l_{add}$ are calculated individually by multiplying a change in the steering torque $(T_\delta - T_{\delta mem})$ by a coefficient Kt, when the steering torque $T_\delta$ is applied to the steering wheel 28 to increase the steering angle $\delta$ greater than the maximum angle. To this end, the coefficient Kt may be based on a result of an experiment or simulation and installed in the first ECU 50.

After thus setting the first correction torque $T''_{add}$ and the second correction torque $T^l_{add}$ at step S17 or S18, the first correction torque $T''_{add}$ and the second correction torque $T^l_{add}$ are corrected in accordance with a length of time to maintain the output torque of the EPS motor 44 to the constant torque. Specifically, at step S19, it is determined whether or not a length of time $Timer_{OH}$ to maintain the output torque of the EPS motor 44 to the constant torque is longer than a predetermined period of time $TM_{OH}$ that is set in such a manner that the EPS motor 44 will not be damaged excessively by maintaining the output torque of the EPS motor 44 to the constant torque.

If the length of time $Timer_{OH}$ is longer than the predetermined period of time $TM_{OH}$ so that the answer of step S19 is YES, the routine progresses to step S20 to offer a warning to the driver by turning on a flag to actuate a warning device (not shown). If the output torque of the EPS motor 44 is maintained to the constant torque longer than the predetermined period of time $TM_{OH}$, a failure may be caused in the EPS motor 44. In addition, as explained later, the yaw rate will be reduced by reducing the correction torques $T''_{add}$ and $T^l_{add}$. For these reasons, the warning is emitted at step S20 to urge the driver to reduce the steering angle $\delta$ of the steering wheel 28. Consequently, the output torque of the EPS motor 44 will be reduced.

Then, at step S21, a predetermined value $T_{sub}$ is subtracted from the upper limit value $T_u$ of the correction torques $T''_{add}$ and $T^l_{add}$. Specifically, the predetermined value $T_{sub}$ is set in such a manner as to prevent an excessive reduction in the yaw rate and to limit damage on the EPS motor 44. That is, the upper limit value $T_u$ of the correction torques $T''_{add}$ and $T^l_{add}$ is reduced gradually by repeating the routine shown in FIGS. 6 to 8.

Then, it is determined at step S22 whether or not the upper limit value $T_u$ of the correction torques $T''_{add}$ and $T^l_{add}$ is greater than zero. In other words, it is determined whether the correction torques $T''_{add}$ and $T^l_{add}$ can be outputted. If the upper limit value $T_u$ is greater than zero so that the answer of step S22 is YES, the routine progresses to step S23 to determine whether or not an absolute value of the first correction torque $T''_{add}$ for the right pair of wheels Dr is greater than the upper limit value $T_u$. If the absolute value of the first correction torque $T''_{add}$ for the right pair of wheels Dr is greater than the upper limit value $T_u$ so that the answer of step S23 is YES, the routine progresses to step S24 to set the first correction torque $T''_{add}$ to the current upper limit value $T_u$. As described, the predetermined value $T_{sub}$ is subtracted from the upper limit value $T_u$ every time the routine is repeated, therefore, the first correction torque $T''_{add}$ is reduced gradually by repeating steps S23 and S24. Consequently, thermal damages on the first motor 2R and the third motor 2R' can be reduced during rotating the right pair of wheels Dr by the torques of the first motor 2R and the third motor 2R' while disengaging the clutches 22 and 22'.

Likewise, at step S25, it is determined whether or not an absolute value of the second correction torque $T^l_{add}$ for the left pair of wheels Dl is greater than the upper limit value $T_u$. If the absolute value of the second correction torque $T^l_{add}$ for the left pair of wheels Dl is greater than the upper limit value $T_u$ so that the answer of step S25 is YES, the routine progresses to step S26 to set the second correction torque $T^l_{add}$ to the current upper limit value $T_u$. As described, the predetermined value $T_{sub}$ is subtracted from the upper limit value $T_u$ every time the routine is repeated, therefore, the second correction torque $T^l_{add}$ is reduced gradually by repeating steps S25 and S26. Consequently, thermal damages on the second motor 2L and the fourth motor 2L' can be reduced during rotating the left pair of wheels Dr by the torques of the second motor 2L and the fourth motor 2L' while disengaging the clutches 22 and 22'. Otherwise, if the absolute value of the first correction torque $T^r_{add}$ for the right pair of wheels Dr is smaller than the upper limit value $T_u$ so that the answer of step S23 is NO, and if the absolute value of the second correction torque $T^l_{add}$ for the left pair of wheels Dl is smaller than the upper limit value $T_u$ so that the answer of step S25 is NO, it is unnecessary to reduce the correction torques $T^r_{add}$ and $T^l_{add}$. in those cases, therefore, the routine skips steps S24 and S26.

By contrast, if the upper limit value $T_u$ is smaller than zero so that the answer of step S22 is NO, the routine progresses to step S27 to set each of the first correction torque $T^r_{add}$ and the second correction torque $T^l_{add}$ individually to zero. Then, the maintenance flag $F_{tqkp}$ is turned off at step S28, and the upper limit value $T_u$ is set to zero at step S29.

Then, at step S30, the first distribution torque $T^r_{di}$ is calculated by adding the first correction torque $T^r_{add}$ to the first predetermined torque $T^r_b$ calculated at step S4, and the second distribution torque $T^l_{di}$ is calculated by adding a second correction torque $T^l_{add}$ to the second predetermined torque $T^l_b$ calculated at step S4. Thereafter, at step S31, the first target torque $T^r_t$ is calculated by adding the first distribution torque $T^r_{di}$ to the first required torque $T^r_r$, and the second target torque $T^l_t$ is calculated by adding the second distribution torque $T^l_{di}$ to the second required torque $T^l_r$. Thereafter, the routine returns. Consequently, command signals for controlling output torques of the motors 2R, 2L, 2R', and 2L', and command signals for controlling torque transmitting capacities of the clutches 22 and 22' are set and transmitted in accordance with the first target torque $T^r_t$ and the second target torque $T^l_t$ calculated at step S31. Optionally, the first target torque $T^r_t$ and the second target torque $T^l_t$ may be further corrected taking account of a vertical force at each wheel, and a friction coefficient (or slip rate) between a road surface and each wheel.

Otherwise, if the absolute value of the steering angle δ of the steering wheel 28 is smaller than the first predetermined angle α so that the answer of step S5 is NO, the routine progresses to step S32 to determine whether or not the absolute value of the steering angle δ is greater than the second predetermined angle ß. Specifically, the second predetermined angle ß is smaller than the first predetermined angle α, and the second predetermined angle ß is set in such a manner that a difference between the first predetermined angle α and the second predetermined angle ß can be used to determine a fact that the driver reduces the steering angle δ intentionally.

If the steering angle δ is greater than the second predetermined angle ß so that the answer of step S32 is YES, the routine progresses to step S19. By contrast, if the steering angle δ is smaller than the second predetermined angle ß so that the answer of step S32 is NO, the routine progresses to step S33 to turn off the determination flag $F_{lk}$, and the steering torque $T_{δmem}$ of the steering torque $T_δ$ at the point when the steering angle δ exceeded the first predetermined angle α is set to zero at step S34. Then, the maintenance flag $F_{tqkp}$ is turned off at step S35, the upper limit value $T_u$ of the correction torques $T^r_{add}$ and $T^l_{add}$ is set to zero at step S36, and the length of time $Timer_{OH}$ to maintain the output torque of the EPS motor 44 to the constant torque is reset at step S37. Thereafter, each of the first correction torque $T^r_{add}$ and the second correction torque $T^l_{add}$ is individually to zero at step S38, and the routine progresses to step S30.

Figure 9:
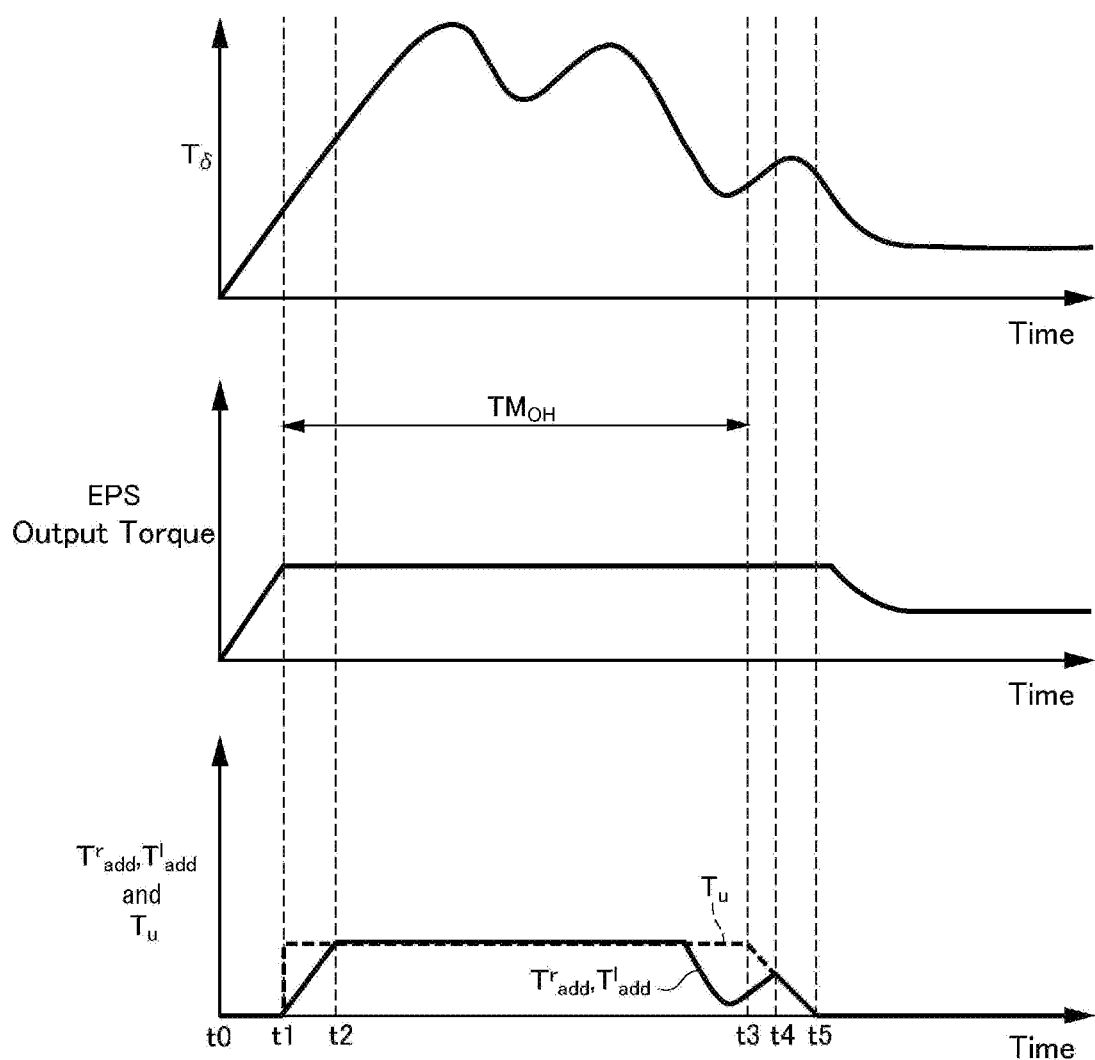
FIG. 9 is a time chart showing temporal changes in of a steering torque, an output torque of an EPS motor; an correction torque, and an upper limit value of the correction torque during execution of the routine according to the second control example.

Temporal changes in the steering torque $T_δ$, the output torque of the EPS motor 44, the correction torques $T^r_{add}$ and $T^l_{add}$, and the upper limit value $T_u$ of the correction torques $T^r_{add}$ and $T^l_{add}$ during execution of the routine shown in FIGS. 6 to 8 are indicated in FIG. 9.

At point t0, the driver starts rotating the steering wheel 28, and hence the steering torque $T_δ$ and the output torque of the EPS motor 44 are increased from point t0. Then, when the steering wheel 28 is rotated to the first predetermined angle α at point t1, the output torque of the EPS motor 44 is maintained to the constant torque. In this situation, the driver still increases the steering torque $T_δ$ applied to the steering wheel 28 thereby increasing the steering torque $T_δ$ continuously after point t1. Consequently, the correction torques $T^r_{add}$ and $T^l_{add}$ are increased from point t1.

When the correction torques $T^r_{add}$ and $T^l_{add}$ are increased to the upper limit value $T_u$ at point t2, the correction torques $T^r_{add}$ and $T^l_{add}$ add are maintained to the upper limit value $T_u$. Then, when the length of time $Timer_{OH}$ to maintain the output torque of the EPS motor 44 reaches the predetermined period of time $TM_{OH}$ at point t3, the upper limit value $T_u$ of the correction torques $T^r_{add}$ and $T^l_{add}$ is reduced from point t3. In this situation, the correction torques $T^r_{add}$ and $T^l_{add}$ are changed in accordance with the steering torque $T_δ$. When the upper limit value $T_u$ is reduced to the correction torques $T^r_{add}$ and $T^l_{add}$ at point t4, the correction torques $T^r_{add}$ and $T^l_{add}$ are maintained to the upper limit value $T_u$ again while being reduced in accordance with a reduction in the upper limit value $T_u$. Eventually, at point 5, the upper limit value $T_u$ is reduced to zero, and the correction torques $T^r_{add}$ and $T^l_{add}$ are set to zero. Thus, the torques applied to the drive wheels 11R, 11L, d 57R, and 57L in accordance with the difference Δγ between the target yaw rate $γ_{tgt}$ calculated based on the steering angle δ and the actual yaw rate $γ_{real}$.

By thus executing the routine shown in FIGS. 6 to 8, a yaw rate greater than the target yaw rate $γ_{tgt}$ achieved in accordance with the steering angle δ of the steering wheel 28 can be achieved when the steering wheel 28 is turned to the maximum rotational angle. According to the embodiment, therefore, a turning performance of the vehicle can be improved.

In addition, the upper limit value $T_u$ of the correction torques $T^r_{add}$ and $T^l_{add}$ is reduced when the length of time $Timer_{OH}$ to maintain the output torque of the EPS motor 44 reaches the predetermined period of time $TM_{OH}$. According to the embodiment, therefore, excessive temperature rise in the motors rotating the outer pair of wheels can be prevented to limit thermal damages on the motors.

Further, when the length of time $Timer_{OH}$ exceeds the predetermined period of time $TM_{OH}$, the warning is emitted to urge the driver to reduce the steering torque $T_δ$ to rotate the steering wheel 28. According to the embodiment, therefore, the output torque of the EPS motor 44 may be reduced and hence thermal damage on the EPS motor 44 may also be prevented. In addition, if a yaw rate is reduced when the steering torque $T_δ$ is reduced by the driver, uncomfortable feeling resulting from the reduction in the yaw rate can be reduced by reducing the correction torques $T^r_{add}$ and $T^l_{add}$.

Although the above exemplary embodiment of the present application have been described, it will be understood by those skilled in the art that the present disclosure should not be limited to the described exemplary embodiments, and various changes and modifications can be made within the spirit and scope of the present application. For example, the drive force control system according to the embodiment may also be applied to an in-wheel motor vehicle in which a motor is individually arranged in each wheel, and to a two-wheel drive vehicle.

In addition, in the steering device 27, the steering shaft 29 may also be rotated hydraulically instead of the motor.

Further, the correction torques $T^r_{add}$ and $T^l_{add}$ may also be reduced when temperatures of the EPS motor and the motors 2R, 2L, 2R', and 2L' exceed predetermined temperatures.

What is claimed is:

1. A drive force control system, comprising:
   a drive unit that applies torques to a right wheel and a left wheel;
   a steering device that turns a pair of steered wheels in accordance with an operating amount of a steering wheel; and
   a controller that controls the torques applied to the right wheel and the left wheel,
   wherein the controller is configured to:
      calculate a target yaw rate based on a steering angle of the steering wheel;
      calculate a first predetermined torque to adjust a torque of the right wheel and a second predetermined torque to adjust a torque of the left wheel, based on a difference between the target yaw rate and an actual yaw rate;
      obtain a steering torque of the steering wheel;
      calculate a first correction torque to correct the first predetermined torque in accordance with the steering torque and a second correction torque to correct the second predetermined torque in accordance with the steering torque, when the steering angle of the steering wheel is equal to or greater than a maximum rotational angle of the steering wheel; and
      transmit a signal to the drive unit to achieve a first target torque of the right wheel calculated based on the first predetermined torque and the first correction torque, and to achieve a second target torque of the left wheel calculated based on the second predetermined torque and the second correction torque.

2. The drive force control system as claimed in claim 1, wherein the controller is further configured to calculate the first correction torque and the second correction torque based on an increase in the steering torque from a point at which the steering angle is equal to or greater than the maximum rotational angle, when the steering torque is increased to rotate the steering wheel to an amount equal to or greater than the maximum rotational angle.

3. The drive force control system as claimed in claim 1, wherein the controller is further configured to reduce the first correction torque and the second correction torque when a length of time to rotate the steering wheel exceeds a predetermined period of time.

4. The drive force control system as claimed in claim 1, wherein the controller is further configured to transmit a warning to a driver when a length of time to rotate the steering wheel exceeds a predetermined period of time.

5. The drive force control system as claimed in claim 1, wherein the steering device includes a motor that applies a torque to a transmission mechanism between the steering wheel and the steered wheels, and
   wherein the controller is further configured to:
      control an output torque of the motor in accordance with the steering torque of the steering wheel, and
      maintain the output torque of the motor to the steering torque at a point when the steering wheel is rotated to the maximum rotational angle, until the steering angle of the steering wheel is reduced to a second predetermined angle that is smaller than the maximum rotational angle.

6. The drive force control system as claimed in claim 1, wherein the controller is further configured to set an upper limit value of the first correction torque and the second correction torque.

7. A drive force control system, comprising:
   a pair of motors that are configured to apply torque to a right wheel and a left wheel;
   a steering shaft connected to a rack and pinion gear that is configured to turn a pair of steered wheels in accordance with an operating amount of a steering wheel;
   a yaw rate sensor configured to detect an actual yaw rate;
   a torque sensor configured to detect a steering torque of the steering wheel;
   a controller that controls the torques applied to the right wheel and the left wheel,
   wherein the controller is further configured to:
      calculate a target yaw rate based on a steering angle of the steering wheel;
      calculate a first predetermined torque to adjust a torque of the right wheel and a second predetermined torque to adjust a torque of the left wheel, based on a difference between the target yaw rate and the actual yaw rate;
      obtain the steering torque;
      calculate a first correction torque to correct the first predetermined torque in accordance with the steering torque and a second correction torque to correct the second predetermined torque in accordance with the steering torque, when the steering angle of the steering wheel is equal to or greater than a maximum rotational angle of the steering wheel; and
      transmit a signal to the pair of motors to achieve a first target torque of the right wheel calculated based on the first predetermined torque and the first correction torque, and to achieve a second target torque of the left wheel calculated based on the second predetermined torque and the second correction torque.

* * * * *